(12) United States Patent
Kropf et al.

(10) Patent No.: US 11,745,743 B2
(45) Date of Patent: Sep. 5, 2023

(54) METHOD FOR OPERATING A MOTOR VEHICLE, CONTROL DEVICE, AND MOTOR VEHICLE

(71) Applicant: AUDI AG, Ingolstadt (DE)

(72) Inventors: Marc Kropf, Ingolstadt (DE); Christian Graf, Ingolstadt (DE); Bernd Schäfer, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 162 days.

(21) Appl. No.: 17/241,619

(22) Filed: Apr. 27, 2021

(65) Prior Publication Data

US 2022/0024457 A1 Jan. 27, 2022

(30) Foreign Application Priority Data

Jul. 24, 2020 (DE) .......................... 102020119553.2

(51) Int. Cl.
*B60W 30/18* (2012.01)
*B60W 50/08* (2020.01)
*B60W 50/00* (2006.01)

(52) U.S. Cl.
CPC .... *B60W 30/18009* (2013.01); *B60W 50/085* (2013.01); *B60W 2050/004* (2013.01); *B60W 2710/0666* (2013.01)

(58) Field of Classification Search
CPC ......... B60W 30/18009; B60W 50/085; B60W 2050/004; B60W 2710/0666
See application file for complete search history.

(56) References Cited

U.S. PATENT DOCUMENTS

| 2014/0045649 | A1* | 2/2014 | Yoshida | B60L 15/20 180/65.265 |
|---|---|---|---|---|
| 2018/0202543 | A1* | 7/2018 | Srinivasan | F16H 61/686 |
| 2018/0265087 | A1* | 9/2018 | Tohta | B60W 10/02 |
| 2019/0001952 | A1* | 1/2019 | Lenaga | B60L 15/20 |

FOREIGN PATENT DOCUMENTS

| DE | 102005033723 | A1 | 2/2007 |
|---|---|---|---|
| DE | 102013018626 | A1 | 5/2015 |
| DE | 102015108067 | A1 | 11/2015 |
| DE | 102017212958 | A1 | 1/2019 |
| DE | 102018200169 | B3 | 5/2019 |

OTHER PUBLICATIONS

German Examination Report dated Jan. 11, 2021 in corresponding German Application No. 102020119553.2; 10 pages; Machine translation attached.
Examination Report dated Jan. 20, 2023, in corresponding German Application No. 102020119553.2, 8 pages.

* cited by examiner

*Primary Examiner* — Jeff A Burke
*Assistant Examiner* — Jamal A Shah
(74) *Attorney, Agent, or Firm* — Maier & Maier, PLLC

(57) ABSTRACT

A method for operating a motor vehicle, the motor vehicle has a control device and a drive train. The drive train includes as components a motor, a clutch, and at least one wheel. The motor is coupled to the at least one wheel via the clutch. The control device controls a rotational speed of the at least one wheel based on a rotational speed specification using a model mapping the drive train of the motor vehicle. A torque generated by the motor is influenced as the manipulated variable as a function of at least one state variable of the drive train determined on the basis of the model.

13 Claims, 3 Drawing Sheets

METHOD FOR OPERATING A MOTOR VEHICLE, CONTROL DEVICE, AND MOTOR VEHICLE

FIELD

The invention relates to a method for operating a motor vehicle, wherein the motor vehicle has a control device and a drive train, the drive train comprising a motor, a clutch, and at least one wheel as components, wherein the motor is coupled to the at least one wheel via the clutch.

BACKGROUND

Multiple separate controllers are generally used in motor vehicles to regulate individual functions of a drive train of a motor vehicle, each of which is used to implement a different function when the drive train is in operation. These controllers can each implement, for example, rotational speed (rpm) limitation, load shock damping, and various component protection functions and/or comfort functions. Various controllers for use in motor vehicles are known from prior art.

DE 10 2018 200 169 B3 describes a method for controlling the speed of a motor vehicle. The motor vehicle has a drive train to which at least one rpm control element is assigned. The drive train comprises at least one drive wheel and a drive motor. The speed of the motor is set by controlling the rotational speed using an rpm sensor which determines the current rotational speed of the motor.

DE 10 2013 018 626 A1 discloses a method for damping the load shock of a drive train for a motor vehicle that can be operated as an all-wheel drive vehicle.

By means of a load shock absorber, which is inserted upstream of a load shock damping unit, a target total torque corresponding to a driver's request is attenuated and an actual total torque is determined. Depending on the specified operating limits of the drive axles, individual torques based on the actual total torque are determined and distributed between the axles of the motor vehicle.

It is also known that, when a motor vehicle is in operation, various safety functions must be implemented which, for example, in a motor vehicle with a clutch in the drive train, ensure that no torque is transmitted from the motor to the wheels of the motor vehicle when the clutch is open, even if the clutch malfunctions. For example, a sensor system can be installed in a motor vehicle, which during a clutch process detects and evaluates, for example, the rpm in the drive train and/or a pressure in the clutch.

SUMMARY

The invention is based on the object of specifying an improved method for operating a motor vehicle which particularly enables a safety function to be implemented with little effort.

This object is achieved, according to the invention, in that, in a method of the type mentioned at the outset, the control device controls a rotational speed of the at least one wheel on the basis of a rotational speed specification using a model mapping the drive train of the motor vehicle, wherein a torque generated by the motor is influenced as the manipulated variable as a function of at least one state variable of the drive train determined on the basis of the model, wherein the control device evaluates switching state information describing a switching state of the clutch and synchronizes the determined state variable in the case of switching information describing a closed clutch as the switching state with a measured actual rotational speed of the motor and/or a measured rotational speed of the at least one wheel, and, in the case of an at least partially open clutch as the switching state, synchronizes switching information with the measured wheel speed and not with the measured actual rotational speed of the motor.

When using a state controller to implement rotational speed control for a drive train of a motor vehicle, different, previously separate controllers can advantageously be combined in a common control concept, such that prioritization and/or arbitration of the separate controllers, each assigned to only a single function, can advantageously be eliminated. By mapping the drive train of the motor vehicle using a model, one or more state variables of the drive train can be determined and used for controlling the drive train. Depending on the at least one determined state variable, the control device generates an actuating torque for adapting the torque of the motor to effect a change in rotational speed by influencing the manipulated variable as part of the rotational speed control by the control device.

The at least one state variable is determined on the basis of the model describing the drive train of the motor vehicle. This makes it possible that the drive train can be controlled to set the actually relevant variables at the location of an effect of the respective control function in the drive train. The state variable can in particular be assigned to various components of the drive train, for example a wheel or a mechanical component such as a drive shaft or a side shaft running from a transmission to a wheel. This enables direct control of the variables occurring at these components.

Synchronization of the state variable with at least one measured variable increases the accuracy of the determination of the state variable, since a discrepancy between the real situation in the drive train, which can be mapped at least partially by measuring a variable, and the model, which is used as the basis for the determination or estimation of the state variable, can be at least partially compensated.

In addition to the option of combining various different control functions in a common controller, the use of the state controller has the advantage that a safety function can also be implemented using the state controller.

The clutch of the motor vehicle can particularly be used to establish and interrupt a mechanical coupling between the motor, designed for example as an electrical machine or an internal combustion engine, and the at least one wheel, particularly to enable a gear change in a transmission of the motor vehicle comprising multiple gears. For this purpose, depending on the switching state information describing a switching state of the clutch, the at least one determined state variable is synchronized with a measured wheel speed of the at least one wheel and/or a measured actual speed of the motor, wherein the state variable in the case that the switching information describes an closed clutch as the switching state is synchronized with the measured actual speed of the motor and/or the measured speed of the at least one wheel, and in the case that the switching information describes an open clutch as the switching state, the state variable is synchronized with the measured wheel speed, particularly only with the measured wheel speed and not with the measured actual speed of the motor.

If the shift information describes an open clutch as the switching state, there is therefore no synchronization of the at least one state variable with the measured actual speed of the motor. When the clutch is open, a switchover takes place from synchronization using the actual speed of the motor or a combination of the actual speed of the motor and the measured wheel speed when the clutch is closed, to synchronization using, particularly exclusively using, the measured wheel speed when the clutch is open. The control device can particularly determine based on operating state information describing a current operating state of the motor vehicle and/or a current operating state of at least one component of the drive train whether synchronization should be with the actual motor speed, with the wheel speed and/or with a combination of motor speed and wheel speed when the clutch is closed.

This has the effect that, if the estimated state variable, for example an estimated wheel speed, deviates from the actual measured wheel speed, the estimated state variable is corrected in the observer. Furthermore, the state controller performs a torque intervention if a measured state variable or an estimated state variable deviates from a target state variable resulting from the specified rotational speed.

If the measured wheel speed increases during the switching process, that is, if the switching state information describes an open clutch as the switching state, the estimated wheel speed also rises as a result of the comparison with the measured wheel speed. If the target state variable for the wheel speed or the rotational speed specification is exceeded by the estimated wheel speed and/or the measured wheel speed, the control device performs a torque intervention, so the motor torque or the motor speed is reduced to maintain a maximum rotational speed. A deviation of the actual, measured wheel speed from the estimated wheel speed particularly occurs when the clutch does not completely disconnect the motor from the wheel in its open state, but a torque is still transmitted from the motor to the at least one wheel due to a defect in the clutch and/or insufficient opening of the clutch.

Particularly in the case of a transmission configured as an automatic transmission, the clutch may be operated with a slip in its open switching state, in which case too high a torque is transmitted via the clutch in the open switching state if the clutch is not sufficiently opened, and this can lead to an undesired increase in the actual and thus also the measured wheel speed, which deviates from defect-free normal operation. A switching state with an at least partially open clutch therefore includes, in addition to a fully open state in which the two clutch sides are completely separated, also a state in which the clutch is operated with a slip, i.e. is only partially open.

A torque transmitted inadvertently due to a defect or malfunction causes a change in the actual, measured wheel speed, wherein the control device corrects the estimated wheel speed and/or other estimated state variables due to the deviation between the measured rotational speed and the wheel speed when synchronizing the state variable. Furthermore, a torque intervention for adjusting the rotational speed is generated if the rotational speed specification or a target state variable derived from the rotational speed specification is exceeded. This torque intervention then acts on the motor and causes a reduction in rotational speed of the motor. If the clutch is still in a state of slipping, the clutch torque will continue to be transmitted. If, due to the reduced motor speed, the slip of the clutch approaches zero, the motor torque is transmitted from the clutch to the at least one wheel and becomes effective there.

Thus the rotational speed is controlled and a specified maximum rotational speed is ensured even when the clutch is in an at least partially open state, for example during a gear change in a transmission of the drive train of the motor vehicle. Furthermore, undesired torque transmission to the at least one wheel when the clutch is in an open switching state can be avoided, such that additional safety functions and the sensors used for this purpose can advantageously be eliminated, or a sensor system can be used that meets the requirements of a lower safety level, e.g. a QM safety level according to ASIL. The control device can thus advantageously prevent undesired torque transmission to the at least one wheel during a shifting process of the transmission.

The wheel speed of the at least one wheel and the actual speed of the motor can in each case be measured, via a rotational speed sensor, for example. For example, speed sensors already installed in for another purpose, for example a rotor position sensor in a motor configured as an electrical machine and/or a wheel speed sensor, for example from an anti-lock braking system, can be used for this purpose.

According to the invention, a wheel speed, a torsion angle of a drive shaft of the drive train, a speed of the motor, an actual torque of the motor, and/or a load torque occurring on the at least one wheel can be determined as a state variable on the basis of the model. By determining the state variable or the state variables on the basis of the model, sensors do not have to be used for all of the state variables to measure the variables used as state variables, which can advantageously reduce the cost of a sensor system. As a result, variables that are difficult to detect or cannot be detected at all can be taken into account as state variables of the state controller. Variables can also be used which, for example, are not detected in the motor vehicle with a sufficiently high resolution to achieve specific control functions, as can be the case, for example, with a wheel speed. However, a measured wheel speed and/or a measured motor speed can be used to synchronize a wheel speed determined as a state variable, a motor speed determined as a state variable and/or other state variables. At least some of the state variables can also be measured via a sensor system to carry out a synchronization of the observer or a model correction via feedback and thus improve the accuracy of the determination of the state variables through the option of error correction. A load torque estimated as a state variable represents an interference variable and can be used, for example, in the context of interference variable compensation. If no interference variable compensation is used, consideration of the load torque in the observer can advantageously result in an observer error disappearing, which is usually not the case without taking the load torque into account.

According to the invention, the state variable can be determined by an observer, particularly a Luenberger observer. The at least one state variable determined using the model can be determined by an observer which forms the basis of the state controller. This observer can in particular be implemented as a Luenberger observer and designed, for example, by means of pole specification, for example with binomial behavior. In addition to implementing the observer as a Luenberger observer, the observer may also be implemented in accordance with a different observer structure.

According to the invention, the switching state information is determined by the control device or transmitted to the control device by a control unit of the motor vehicle. The control device can, for example, be connected to the clutch and determine itself when a change in the switching state takes place between a closed clutch and an open clutch or vice versa, such that the control device can adjust the synchronization of the at least one determined state variable.

It is also possible for the switching information to be transmitted from a control unit of the motor vehicle to the control device. For example, the control unit can be a control unit assigned to the clutch, which detects a clutch state, or it can be a transmission control unit of an automated transmission, for example a dual clutch transmission.

According to the invention, error status information can be generated if a torque intervention is generated by the control device if the switching status information describes an open clutch, wherein the error status information is transmitted to at least one control unit of the motor vehicle and/or the control device performs at least one action assigned to the error status information.

A torque intervention by the control device is particularly generated if the clutch is in an open switching state when the wheel speed exceeds a target rotational speed or a maximum rotational speed. This indicates that the clutch is not sufficiently open, the cause of which particularly is a defect in the clutch, such that the control device can advantageously generate error status information relating to a faulty clutch function, particular a faulty opening of the clutch. The error status information can be transmitted from the control device to a control unit of the motor vehicle, such that the control unit can, for example, issue a warning to a driver and/or restrict the vehicle function. Depending on the configuration of the control device, an action assigned to the error status information, such as displaying a warning and/or restricting a motor vehicle function, can also be carried out directly by the control device.

According to the invention, the rotational speed specification is adjusted to a limitation of a maximum rotational speed and/or a minimum rotational speed and/or to a target rotational speed control. This makes it possible to restrict the speed to a range between a maximum rotational speed and/or a minimum rotational speed depending on the function to be achieved in the control method. The target rotational speed can also be controlled via the rotational speed specification used in the method according to the invention or the control device implementing the method.

According to the invention, the manipulated variable is adjusted to dampen a vibration of at least one component of the drive train and/or to protect a component of the drive train. For example, the state controller can be designed specifying quality criteria, for example according to Riccati, such that a dynamic and a damping behavior of the state controller can be set such that, for example, the torsion of a mechanical component of the drive train, for example a drive shaft or a side shaft, is limited to a maximum value. By damping a vibration of at least one component of the drive train, a comfort function can be implemented which enables the most uniform and jerk-free driving possible.

According to the invention, the rotational speed specification can be adjusted by a slip control function to limit a slip of the at least one wheel and/or the rotational speed specification can be adjusted by an all-wheel control function to create a rotational speed difference. By appropriately dimensioning the state controller in the design phase, its dynamics and damping can be set in such a way that a rotational speed specification determined by a slip control function to limit slip of the at least one wheel is set in accordance with the requirements for the slip control function. In addition or alternatively, a rotational speed specified by an all-wheel control function, for example to control an optimum differential speed between two axles for a motor vehicle with an all-wheel drive, can also be set with appropriate damping or appropriate dynamics by the state controller.

According to the invention, the rotational speed can be specified by a driving mode control function, particularly to carry out a driving mode, a braking mode, and/or controlled braking. Accordingly, the state controller is designed such that the damping generated by the state controller or the dynamics of the rotational speed control take place in such a way that the rotational speed changes in accordance with the specifications or requirements of a driving mode or a braking mode. Adjustment to various driving maneuvers to be carried out, such as controlled braking or the like, is possible as well. The driving mode control function can particularly be an autonomous driving mode control, which can be used for autonomous operation of the motor vehicle.

A control device according to the invention comprises at least one control unit, wherein the control unit is configured to perform a method according to the invention. The control unit of the control device can also adjust the rotational speed specification for the control device to implement a specific function. It is also possible that the rotational speed specification is particularly adjusted in each case by another control unit, such that, for example, a slip control, driving control and/or all-wheel control function is implemented in one or more additional control units, wherein a rotational speed specification determined and/or adjusted in each case is transmitted to the control device for controlling the drive train.

A motor vehicle according to the invention comprises a drive train and a control device according to the invention. The drive train of the motor vehicle particularly comprises a motor, a clutch, and at least one wheel, wherein the motor is coupled to the at least one wheel via the clutch.

All of the advantages described in reference to the method according to the invention also apply accordingly to the motor vehicle according to the invention.

BRIEF DESCRIPTION OF THE FIGURES

Further advantages and details of the invention will be apparent from the exemplary embodiments described below and with reference to the drawings. Wherein, schematically.

DETAILED DESCRIPTION

Figure 1:
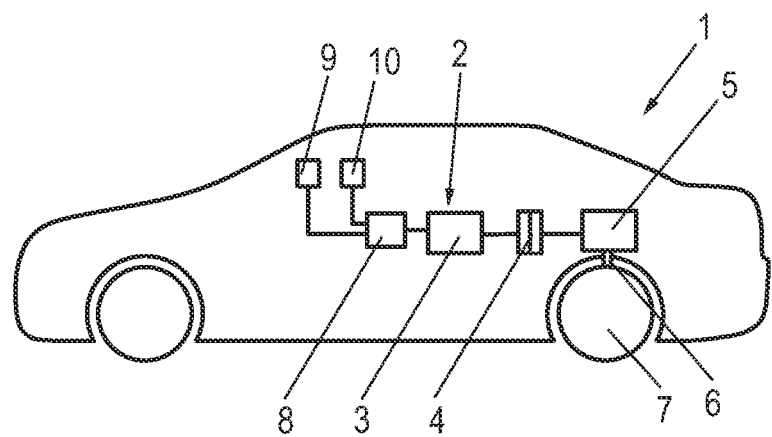
FIG. 1 is a side view of an exemplary embodiment of a motor vehicle according to the invention.

FIG. 1 shows a schematic representation of a side view of a motor vehicle 1 according to the invention. The motor vehicle 1 comprises a drive train 2 with a motor 3, which is coupled via a clutch 4 to a transmission 5 comprising multiple gears and via at least one mechanical component configured as a drive shaft 6 or side shaft to at least one wheel 7 of the drive train 2.

The clutch 4 is a releasable clutch, which can be moved between a closed switching state, in which the motor 3 is coupled to the transmission 5 and the drive shaft 6 is coupled to the wheel 7, and an open switching state, in which the motor 3 is disconnected from the transmission 5 and thus also is at least partially disconnected from the drive shaft 6 and the wheel 7. The clutch can be opened, for example, when a gear of the transmission 5 is shifted. The clutch 4 and the transmission 5 can be operated manually or it can be an automated clutch and/or an automated transmission, for example a dual clutch transmission. The motor 3 can be designed as an internal combustion engine and/or as an electric motor. The clutch 4 can be operated with slip, particularly in the case of a transmission 5 configured as an automatic transmission, such that a torque is transmitted in a targeted manner even when the clutch is open.

To control the drive train 2, the motor vehicle 1 comprises a control device 8. The control device 8 comprises a control unit and is connected to other control units 9, 10 of the motor vehicle 1. The control device 8 is set up to control a speed of the at least one wheel 7 based on a rotational speed specification using a model mapping the drive train 2 of the motor vehicle 1, wherein a torque generated by the motor 3 as a manipulated variable is influenced depending on at least one state variable of the drive train 2 determined on the basis of the model determined is influenced. The rotational speed specification can, for example, depend on a current accelerator pedal position and/or, as will be described in more detail below, be influenced and/or specified by one of the other control units 9, 10.

The speed of the at least one wheel 7 by the control device 8 is controlled by means of a state controller which uses state variables determined on the basis of a model of the drive train 2 to control the rotational speed or to set the manipulated variable. A wheel speed of the at least one wheel 7, a torsion angle of the at least one drive shaft 6 of the drive train 2, a speed of the motor 3, an actual torque of the motor 3, and/or a load torque occurring at the at least one wheel 7 can be used as state variables. The state variables can be determined on the basis of the model using an observer. The observer for determining the state variables can be implemented as a Luenberger observer, for example. Instead of an estimate by the observer, the actual torque of the motor 3 can also be taken into account in a simulator part of the observer and be included in the state control function. The load torque represents an estimated interference variable, which can be used, for example, in the context of a interference variable compensation. If no interference variable compensation is used, consideration of the load torque in the observer can advantageously result in an observer error disappearing, which is usually not the case without taking the load torque into account.

Figure 2:
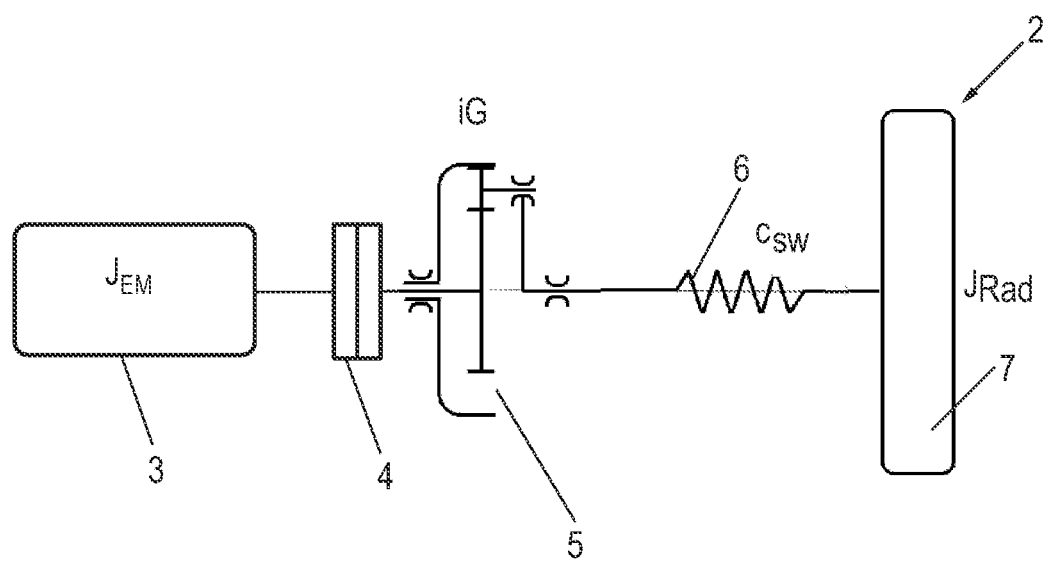
FIG. 2 shows a model of a drive train of a motor vehicle used for model description.

A schematic representation of the drive train 2 is shown in FIG. 2. It is shown here that the motor 3 is coupled to the at least one wheel 7 via the clutch 4, the transmission 5, and at least one drive shaft 6. Depending on the configuration of the motor vehicle 1, it is of course also possible to couple the motor 3 via the clutch 4 and the transmission 5 with two drive shafts 6, each configured as a side shaft, and two wheels 7, for example if the motor vehicle has a motor 3 configured for driving one of the axles of the motor vehicle. Similarly, the drive train 2 can also include further components, for example to form an all-wheel drive, such that four wheels 7 are coupled to the motor 3 via a plurality of drive shafts or side shafts and/or at least one transmission 5. The motor vehicle 1 can include more than one motor 3, for example each of the four wheels 7 of the motor vehicle 1 can be driven by its own motor 3 or, for example, one of the two axles of the motor vehicle 1 can be driven by two motors 3.

In the model shown, these configurations can be taken into account when selecting the model parameters of the at least one drive shaft 6 or the at least one wheel 7. The exemplary model of the drive train 2 shown in FIG. 2 relates to the closed switching state of the clutch 4 in which the motor 3 is coupled to the wheel 7. The model of the drive train 2 represents a two-mass oscillator in which the motor 3 is coupled to the at least one wheel 7 via the closed clutch 4, the transmission 5, and the drive shaft 6. The motor 3 has a mass inertia $J_{EM}$ and the wheel 7 has a mass inertia $J_{wheel}$. The drive shaft 6 is assigned a rigidity $C_{SW}$. It is possible that, in addition, at least mechanical damping of one of the components of the drive train 2 is taken into account in the model, particularly if neglecting the mechanical damping or at least partial consideration of the mechanical damping is not reasonably possible when selecting one of the aforementioned parameters for the components 4 of the drive train 2. The block diagram of the drive train 2 shown in FIG. 3 can be derived from the depicted model of the two-mass oscillator for the drive train 2.

Figure 3:
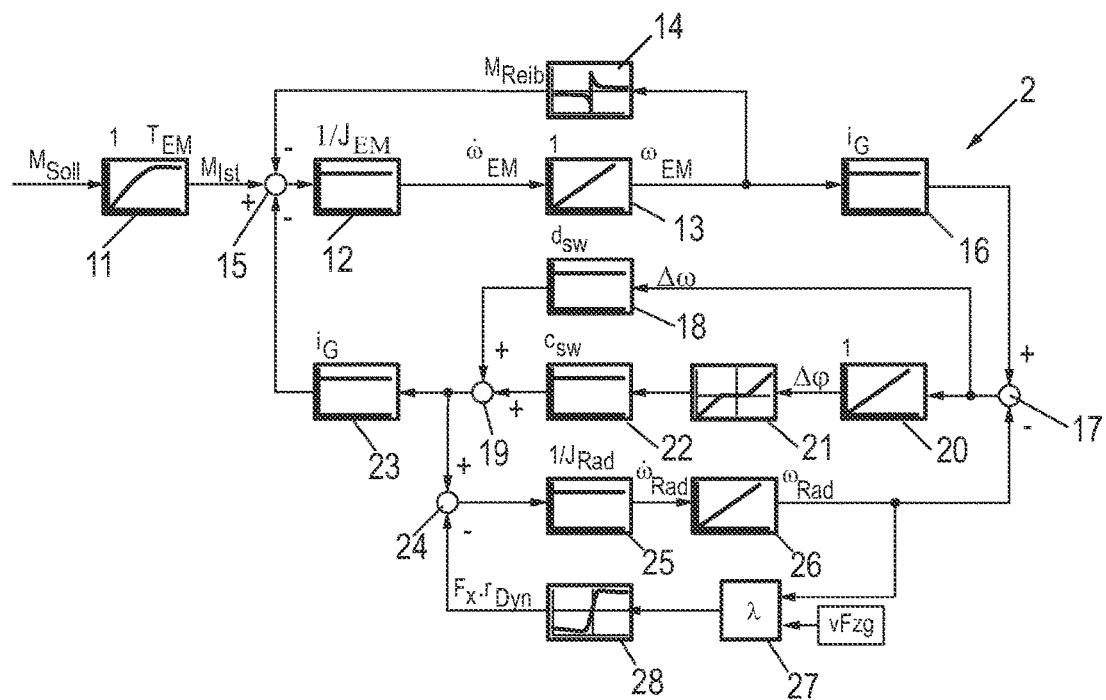
FIG. 3 shows a model of a controlled system for a method according to the invention.

The exemplary block diagram shown in FIG. 3 represents a model of the drive train 2 based on the two-mass oscillator shown in FIG. 2. The block diagram thus provides the controlled system for a control of the drive train 2 and is based on a target torque $M_{TARGET}$ of the motor 3 from which a PT1 element 11 having a gain of 1 and a transmission time constant $T_{EM}$ in an actual torque $M_{ACTUAL}$ of the motor 3 is implemented. This corresponds to the generation of the actual torque $M_{ACTUAL}$ based on the target torque 114 $M_{target}$ by the motor 3. As shown by the P element 12, the mass inertia $J_{EM}$ of the motor 3 based on the actual torque $M_{ACTUAL}$ influences a change in rotational speed $\dot{\omega}_{EM}$ of the motor speed $\omega_{EM}$. The rotational speed change $\dot{\omega}_{EM}$ is connected to an I element 13 with the motor speed $\omega_{EM}$, which depending on a nonlinear function 14 generates a friction torque $M_{FRIC}$ of the motor that counteracts the actual torque $M_{ACTUAL}$, as shown at the summary node 15.

The motor speed $\omega_{EM}$ is connected to the node 17 via the I element 16 with the inverse gear ratio $i_g$ as a gain factor. The speed difference $\Delta w$ determined at the node 17 between the rotational speed of the transmission 5 and the speed $\omega_{wheel}$ of the at least one wheel 7 subtracted therefrom acts on the summary node 19 via a P element 18 with the gain factor $d_{sw}$.

A torsion angle $\Delta\varphi$ of the side shaft, which is also fed to node 19 as a gain factor via a nonlinear function 21 and a P element 22 with the rigidity $C_{SW}$ of the drive shaft 6 results from the speed difference $\Delta\omega$ by integration over an I element 20. The node 19 acts back on the node 15 via the P element 23, wherein the gain factor of the P element 23 corresponds to the gear ratio $i_G$. The torque occurring on the wheel side determined at the output of node 19 acts back on the node 17 as a rotational speed change $\dot{\omega}_{WHEEL}$ via the node 24 and accordingly via the I element 25 with the inverse inertia $J_{WHEEL}$ of the at least one wheel 7 as a gain factor, or as wheel speed $\omega_{WHEEL}$ after integration in an I element 26.

The load torque resulting from a slip $\lambda$ as a block 27 at the at least one wheel 7 $F_x \cdot r_{Dyn}$ is also subtracted at the node 24, wherein the slip $\lambda$ determines the wheel speed $\omega_{WHEEL}$ via a non-linear function 28 as a function of a current speed of the vehicle $V_{VEH}$. The load torque $F_x \cdot r_{Dyn}$ results from a force acting on the at least one wheel 7 $F_x$ multiplied by a dynamic wheel diameter $r_{Dyn}$ of the at least one wheel 7.

The above-described model of the drive train 2 can now be simplified in that particularly the non-linear effects are neglected and/or are understood as an additional component of the load torque $F_x \cdot r_{Dyn}$ considered below as an interference variable of the control function. This makes it possible to describe the drive train 2 by the following equations in the state space, transformed to the wheel plane:

$$\begin{bmatrix} \dot\omega_{WHEEL} \\ \dot\omega_{EM,R} \\ \dot\omega \end{bmatrix} = \begin{bmatrix} 0 & 0 & \frac{c_{SW}}{J_{wheel}} \\ 0 & 0 & -\frac{c_{SW}}{J_{EM,R}} \\ -1 & 1 & 0 \end{bmatrix} \cdot \begin{bmatrix} \omega_{WHEEL} \\ \omega_{EM} \\ \Delta\varphi \end{bmatrix} + \begin{bmatrix} 0 \\ \frac{1}{J_{EM,R}} \\ 0 \end{bmatrix} \cdot M_{Actual} + \begin{bmatrix} -\frac{1}{J_{wheel}} \\ 0 \\ 0 \end{bmatrix} \cdot F_x \cdot r_{Dyn} \quad (1)$$

$$\begin{bmatrix} \omega_{WHEEL} \\ \omega_{EM,R} \end{bmatrix} = \begin{bmatrix} 1 & 0 & 0 \\ 0 & 1 & 0 \end{bmatrix} \cdot \begin{bmatrix} \omega_{WHEEL} \\ \omega_{EM,R} \\ \Delta\varphi \end{bmatrix} \quad (2)$$

Equations (1) and (2) represent a model of the drive train and can now be used as a basis for an observer to determine state variables in the drive train 2. As a result of the transformation on the wheel plane, the inverse gear ratio is included $i_G$ in the wheel-side variables of the motor speed $\omega_{EM,R}$ and the inertia $J_{EM,R}$. The observer can then be used in a state controller for rotational speed-based control of the drive train.

$$\begin{bmatrix} \dot\omega_{WHEEL} \\ \dot\omega_{EM,R} \\ \dot\omega \\ \dot F_x \cdot r_{Dyn} \end{bmatrix} = \begin{bmatrix} 0 & 0 & \frac{c_{SW}}{J_{wheel}} & -\frac{1}{J_{wheel}} \\ 0 & 0 & -\frac{c_{SW}}{J_{EM,R}} & 0 \\ -1 & 1 & 0 & 0 \\ 0 & 0 & 0 & 0 \end{bmatrix} \cdot \begin{bmatrix} \omega_{WHEEL} \\ \omega_{EM,R} \\ \Delta\varphi \\ F_x \cdot r_{Dyn} \end{bmatrix} + \begin{bmatrix} 0 \\ \frac{1}{J_{EM,R}} \\ 0 \\ 0 \end{bmatrix} \cdot M_{Actual} \quad (3)$$

$$\begin{bmatrix} \omega_{WHEEL} \\ \omega_{EM,R} \end{bmatrix} = \begin{bmatrix} 1 & 0 & 0 & 0 \\ 0 & 1 & 0 & 0 \end{bmatrix} \cdot \begin{bmatrix} \omega_{WHEEL} \\ \omega_{EM,R} \\ \Delta\varphi \\ F_x \cdot r_{Dyn} \end{bmatrix} \quad (4)$$

Here, the equations (3) and (4) are a description of the observer in the state space, which contain a model of an interference in addition to the equations (1) and (2).

The vector $$\begin{bmatrix} \omega_{WHEEL} \\ \omega_{EM,R} \\ \Delta\varphi \\ F_x \cdot r_{Dyn} \end{bmatrix}$$

contains the state variables estimated by the observer, namely, the wheel speed $\omega_{WHEEL}$, the motor speed $\omega_{EM,R}$, the torsion angle of the at least one side shaft $\Delta\varphi$, and the load torque $F_x \cdot r_{Dyn}$. In the state control function that includes the observer, an actual torque $M_{ACTUAL}$ of the motor 3 can also be used as a state variable, wherein the actual torque $M_{ACTUAL}$ can be determined by a direct measurement on the motor and/or by an indirect measurement using another variable. In a state space description of the controlled system, which represents the basis for the design of the state controller, the actual torque $M_{ACTUAL}$ of the motor 3 can be included instead of the load torque $F_x \cdot r_{Dyn}$. For example, the system of differential equations can be expanded by a differential equation that describes these dynamics in the case of a non-negligible dynamic of the actual torque development. The differential equation system can then be reduced by the differential equation for describing the dynamics of the load torque, if this is no longer required. In addition or as an alternative to a measurement of the actual torque $M_{ACTUAL}$, this torque can also be estimated by the observer or generated via a simulator part of the observer. For the wheel speed $\omega_{WHEEL}$ and the motor speed $\omega_{EM}$, a measured value can be used additionally or alternatively, which value is determined, for example, via a speed sensor associated with the wheel 7 or a speed sensor associated with the motor 3.

Figure 4:
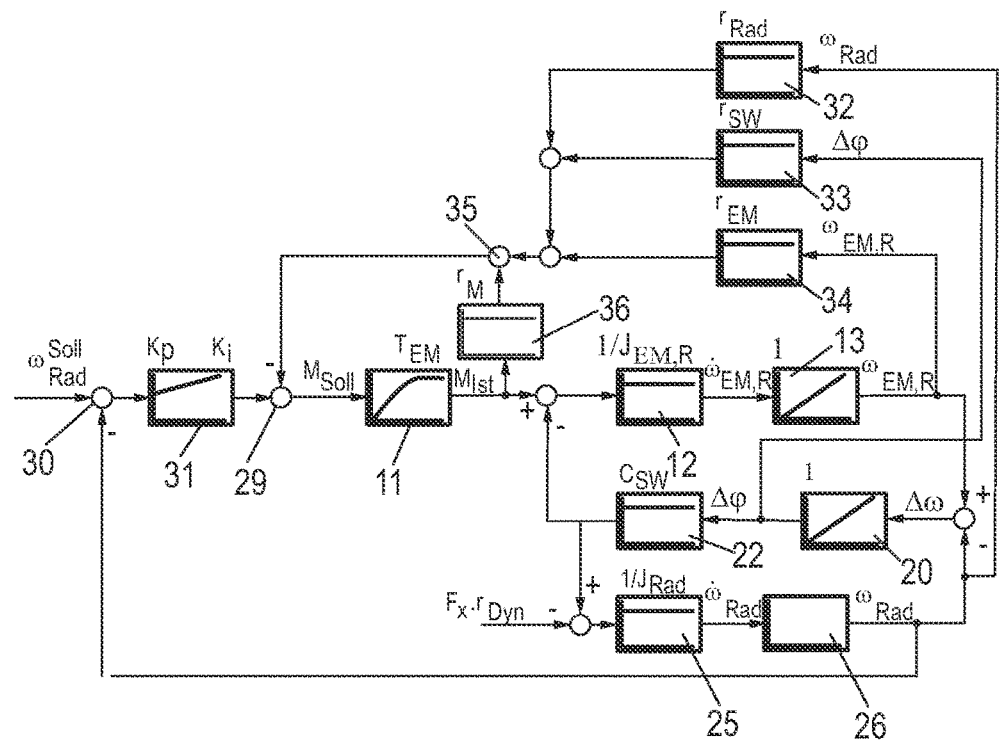
FIG. 4 is a block diagram of a control device of a motor vehicle according to the invention.

FIG. 4 shows a block diagram of the speed controller used in an exemplary embodiment of a method for controlling the drive train 2 of the motor vehicle 1. This speed controller can be implemented in the control unit of the control device 8 of the motor vehicle 1. The speed control function is based on a rotational speed specification $\omega_{WHEEL}^{TARGET}$ which is fed to the controller at node 30. The rotational speed specification $\omega_{WHEEL}^{TARGET}$, or a control deviation formed from the rotational speed specification $\omega_{WHEEL}^{TARGET}$, is connected to the node 29 via a PI controller 31. A wheel speed of the at least one wheel $\omega_{WHEEL}$, a torsion angle of the drive shaft 6 $\Delta\varphi$, a speed of the motor $\omega_{EM}$, and the load torque acting as an interference torque are $F_x \cdot r_{Dyn}$ determined on the basis of the model described using the formulas (1) and (2), using an observer implemented, for example, as a Luenberger observer. As another state variable, an actual torque $M_{ACTUAL}$ of the motor 3 is determined by a measurement. The actual torque $M_{ACTUAL}$ of the motor 3 can be measured directly or determined from measuring another variable, for example, a measured actual motor current. In addition or as an alternative to a measurement of the actual torque $M_{ACTUAL}$ this torque can also be estimated by the observer or generated via a simulator part of the observer.

The determined state variables are used to influence the target motor torque $M_{TARGET}$ used as a manipulated variable for the rotational speed control function. The wheel speed $\omega_{WHEEL}$ acts via a P element 32 with the gain factor $r_{WHEEL}$, the determined torsion angle $\Delta\varphi$ acts via a P element 33 with the gain factor $r_{SW}$ and the motor speed $\omega_{EM,R}$ acts via a P element 34 with the gain factor $r_{EM}$ in each case on the node 35. Likewise, the actual torque $M_{Actual}$ of the motor 3 acts via a P element 36 with a gain factor $r_m$ on the node 35.

The sum formed in node 35 has a negative effect in node 29, for example, on a torque for generating the manipulated variable $M_{TARGET}$ determined from the rotational speed specification $\omega_{WHEEL}^{TARGET}$ via the PI controller 31. The variables that are neglected with respect to the model shown in FIG. 3 are at least partially summarized by $F_x \cdot r_{Dyn}$, which is interpreted as an interference variable and which is also determined as a state variable. The load torque $F_x \cdot r_{Dyn}$ can be assumed to be constant over a cycle time of the control function and re-estimated for each new cycle. The load torque $F_x \cdot r_{Dyn}$ can particularly be used when implementing an interference variable. When using a PI state controller, the estimated load torque has no influence. An influence on the controlled drive train generated by a load torque actually acting on at least one wheel 5 is taken into account by the I component in the PI controller 31.

The state variables determined by the observer can particularly be compared as a function of a current operating state of at least one of the components of the drive train 2 with an actual speed determined via a speed sensor assigned to the motor 3 and/or a wheel speed determined via a speed sensor assigned to the at least one wheel 7 to achieve a higher accuracy of the estimation of the state variables by the observer. The PI controller 31 also compensates for interference variables, wherein the I component of the PI controller 31 ensures stationary accuracy and performs stationary compensation for the effects neglected in the modeling with respect to controlling the rotational speed. As an alternative to the design of the controller as a PI state controller via the PI controller 31, it is also possible to implement the control function as a state controller with interference variable compensation to achieve improved stationary accuracy. The load torque can be used $F_x \cdot r_{Dyn}$ as an interference variable. It is possible that a sequence error structure is used with a PI state controller or when using interference variable compensation if asymptotic compensation of a control deviation is to take place for ramp-shaped target value specifications.

Depending on the drive train 2 of the motor vehicle 1 on which the model used in the control function is based, various functions can be implemented by means of the rotational speed control method. Furthermore, the method or the control device 8 designed to implement the method to different motor vehicle models or different model variants differing, for example, in the design of their respective drive train 2, is adjusted in a simple manner. This can be done by selecting the drive train-related model parameters $J_{EM,R}$, $J_{WHEEL}$, and $C_{SW}$. The control function can be adjusted to various functions by selecting the respective gain factors $r_{WHEEL}$, $r_{SW}$, $r_{EM}$, and $r_M$ as well as $K_p$ and $K_r$. This makes it possible to adjust the damping behavior of the control function to the requirements specified for the respective function.

For example, the manipulated variable, that is to say the target motor torque $M_{TARGET}$, is adjusted to dampen a vibration of at least one component of the drive train 2 and/or to protect a component of the drive train 2. In this way, excessive torsion in the drive shaft 6 can be prevented, for example. The rotational speed specification $\omega_{WHEEL}^{TARGET}$ can also be adjusted by a slip control function to limit a slip of the at least one wheel 7, wherein a slip control is carried out accordingly by the controller. Also, a rotational speed specification determined by an all-wheel drive control can be adjusted with a correspondingly adapted controller to form a rotational speed difference, for example in a motor vehicle 1 that includes two motors 3, each coupled to an axle and thus to two wheels 5.

The rotational speed specification can also come from a driving mode control function of the motor vehicle 1, for example to carry out a driving mode, a braking mode, and/or various driving maneuvers such as controlled braking. In this case, too, the drive of the motor vehicle 1 can be controlled by means of the drive control method in accordance with the rotational speed specification and damping adjusted to the respective application, or damping behavior adjusted to the respective application.

Figure 5:
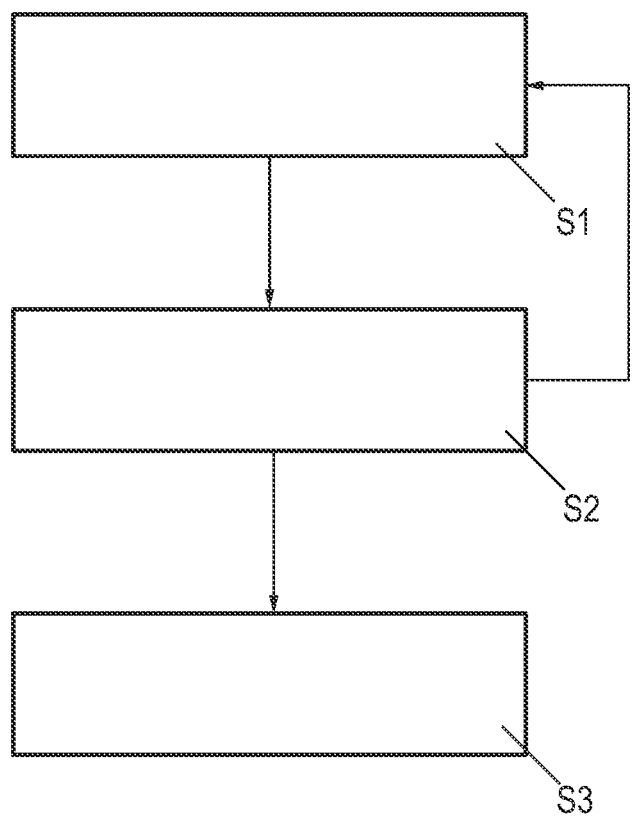
FIG. 5 is a flow chart of an exemplary embodiment of a method according to the invention for operating a motor vehicle.

FIG. 5 shows a flow chart of a method for operating a motor vehicle which can be carried out by the control device 8 of the motor vehicle 1. As described above, the variables $\omega_{WHEEL}$, $\omega_{EM,R}$, $\Delta\varphi$, and $F_x \cdot r_{Dyn}$ can be determined as state variables in the control device 8 compared to at least one measured value to increase the accuracy of their determination. These variables are synchronized with a measured wheel speed and/or a measured actual speed of the motor. The wheel speed can be measured, for example, via a rotational speed sensor assigned to the at least one wheel 7 of the motor vehicle 1, for example the rotational speed sensor of an ABS system. The actual speed of the motor 3 can, for example, be measured via a tachometer of the motor 3, e.g. via a rotor position sensor of a motor 3 configured as an electrical machine and/or a rotational speed sensor of a motor 3 configured as an internal combustion engine. By synchronizing the state variables with at least one measured variable, a discrepancy between the state variable determination using the model and the state variables actually occurring in the real system can be corrected. Furthermore, by selecting the variable used for the synchronization, a safety function of the motor vehicle 1 can be implemented by the control device 8.

In a step S1 of the method, in which the motor vehicle 1 is in a driving mode, for example, and the clutch 4 is accordingly in a closed switching state, such that the complete torque can be transmitted from the motor 3 to the at least one drive wheel 7, the observer is synchronized with the measured actual speed of the motor 3 and/or the measured wheel speed of the at least one wheel 5. Synchronization can particularly be carried out based on the operating status information describing an operating state of the motor vehicle, using the measured actual speed of the motor 3 and/or the measured wheel speed of the at least one wheel 5.

If the clutch 4 is at least partially opened in a step S2, this is communicated to the control device 8 via switching state information which describes the switching state of the clutch 4. The control device 8 can determine the switching state information itself or can receive it from another control unit 9 of the motor vehicle 1. In the event that the switching state information describes an open switching state of the clutch 4, the control device 8 changes the synchronization of the observer with the measured actual speed of the motor 3 and/or the measured wheel speed from normal driving to a synchronization with a measured wheel speed of the at least one wheel 7. A comparison of the actual speed of the motor can be dispensed with if the clutch 4 is open, since the observer assumes a mechanical coupling between the motor and at least one wheel, which is not, or at least no longer, present as it would be in the case of a closed clutch when the clutch 4 is at least partially open.

By synchronizing the estimated wheel speed with the measured wheel speed, that is, the actual speed of the at least one wheel 7, the estimated wheel speed approaches the measured wheel speed. If the estimated wheel speed deviates from the rotational speed specification or a target value specification derived from the rotational speed specification, the control device 8 generates a torque intervention, such that the wheel speed is also controlled during the shifting process. This can be implemented both in the case of a fully open clutch 4, in which a torque is undesirably transmitted in the open state, and in the case of a clutch 4 operated with slip in the open state, in which an incorrect torque is transmitted in the open state.

Such a discrepancy between the measured wheel speed and the wheel speed measured as a state variable and/or another of the state variables can occur if there is a defect and/or a malfunction of the clutch 4, such that a torque is transmitted from the motor 3 to the transmission 5 or via the drive shaft 6 also to the at least one wheel 7 even in the open state of a completely opening clutch 4. In the case of a clutch operated with slip, a defect and/or a malfunction can transmit a torque that deviates from a torque when the clutch is working correctly, such that the rotational speed of the at least one wheel 7 does not change in the desired manner.

By changing the comparison of the state variables in the control device 8 as a function of the switching state information, if a fault occurs in the clutch 4, which leads to a torque transmission even when the clutch 4 is opened, a safety function is created by generating one of the speed changes at the wheel counteracting actuating torque is realized by the control device 8.

When a torque intervention is generated by the control device 8 in the case of switching state information describing an open clutch, the clutch 4 may be defective. To take this possible defect into account in the further operation of the motor vehicle 1, the control device 8 generates error status information in a step S3, wherein the error status information is transmitted to at least one other control unit 10 of the motor vehicle 1.

An action which is assigned to the error status information can be carried out by the other control device 10. The action can be, for example, a warning to a driver of the motor vehicle 1, display of information indicating the error condition of the clutch 4 on a display device of the motor vehicle 1, and/or restriction of the driving operation of the motor vehicle 1. Alternatively, the control device 8 itself can be configured to perform the action assigned to the error status information, such that the action can be performed by the control device 8 itself when the error occurs.

If there is no discrepancy between the state variable and the measured wheel speed in step S2, the method can be continued in step S1 after the clutch has been closed, i.e. after a change to the closed switching state of clutch 4, by once again synchronizing the state variables with a measured motor speed.

Implementing the safety function in the control device 8 has the advantage that rotational speed control is possible during the shifting process even when the clutch 4 is opened. The rotational speed of the motor 3 can be reduced by the torque intervention of the control device 8. Advantageously, other systems, particularly sensor devices or the like, to ensure freedom from torque of a drive axle when the clutch 4 is open can be eliminated, and/or such sensors can be implemented at a lower safety requirement level in motor vehicle 1.

The invention claimed is:

1. A method for operating a motor vehicle, the motor vehicle comprising a control device and a drive train, wherein the drive train includes a motor which is coupled to at least one wheel via a clutch, and wherein the control device is configured to control, using a model which maps the drive train, a rotational speed of the at least one wheel to meet a target rotational speed by influencing a torque generated by the motor based on at least one state variable of the drive train, the method comprising: evaluating switching state information which describes a switching state of the clutch, correcting the at least one state variable according to the switching state information such that: when the switching state information describes the clutch as closed, the at least one state variable is corrected with a measured actual rotational speed of the motor and/or a measured actual rotational speed of the at least one wheel, and when the switching state information describes the clutch as at least partially open, the at least one state variable is corrected with the measured actual rotational speed of the at least one wheel and not with the measured actual rotational speed of the motor, initiating a torque intervention when the at least one state variable and/or the measured actual rotational speed of the at least one wheel exceed the target rotational speed during a shifting process in which the shifting state information describes the clutch as at least partially open, and identifying a fault in the clutch when the measured actual rotational speed of the at least one wheel does not respond to the torque intervention consistent with the target rotational speed in the model.

2. The method according to claim 1, wherein the at least one state variable comprises at least one of a wheel speed, a torsion angle of a drive shaft of the drive train, a speed of the motor, an actual torque of the motor, and a load torque occurring on the at least one wheel.

3. The method according to claim 1, wherein the state variable is determined by a Luenberger observer.

4. The method according to claim 1, wherein the switching state information is determined by the control device or transmitted from a control unit of the motor vehicle to the control device.

5. The method according to claim 1, wherein error status information is generated following the torque intervention and transmitted to at least one control unit of the motor vehicle.

6. The method according to claim 5, wherein the error status information indicates a defect in or with the clutch.

7. The method according to claim 1, wherein the target rotational speed is bounded by a maximum and/or a minimum rotational speed.

8. The method according to claim 1, wherein the model considers at least a partial mechanical damping of at least one component of the drive train and influences the torque generated by the motor to dampen vibrations of the at least one component.

9. The method according to claim 1, wherein the target rotational speed is adjusted to limit a slip of the at least one wheel.

10. The method according to claim 1, wherein the at least one wheel is at least two wheels and the motor vehicle further comprises a second motor, and
wherein the target rotational speed is adjusted to create a speed difference between the at least two wheels.

11. The method according to claim 1, wherein the target rotational speed is adjusted by a driving mode control function which comprises at least one of a driving mode, a braking mode, and/or a controlled braking mode.

12. A control device for a motor vehicle configured to carry out the method according to claim 1.

13. A motor vehicle comprising a drive train and the control device according to claim 12.

* * * * *